FILE FOR VERTICALLY MOUNTED TAPE REELS

Filed May 3, 1965 2 Sheets-Sheet 1

INVENTOR
Robert G. Clouthier
BY
Clayton L. Jenks
ATTORNEY

FILE FOR VERTICALLY MOUNTED TAPE REELS

Filed May 3, 1965 2 Sheets-Sheet 2

INVENTOR
Robert G. Clouthier
BY
Clayton L. Jenks
ATTORNEY

United States Patent Office 3,298,530
Patented Jan. 17, 1967

3,298,530
FILE FOR VERTICALLY MOUNTED TAPE REELS

Robert G. Clouthier, 421 Bullard St.,
Holden, Mass. 01520

Filed May 3, 1965, Ser. No. 452,813
11 Claims. (Cl. 211—40)

This invention relates to a tape reel file slidably mounted on a vertical wall support.

Tape reels for magnetic or electronic data processing tapes and photographic motion picture films, herein termed tapes, are desirably mounted in a vertical closely spaced arrangement on a wall. A problem is, however, involved in providing for the ready storage or removal of the reel and conserving the storage space. The reel construction should be such as to not interfere with any subsequent normal rotational use of the tape. It is customary to mount loaded reels in a two-part telescoping casing which protects the tape from dust and other external matter. Such casings are expensive and space wasting. It is desirable to file the reels alone in a compact side by side arrangement and yet permit indexed storage and ready removal. It is desirable that such a reel, independent of any storage casing therefor, be slidably mounted on and easily removed from a slide support on a vertical wall for processing operations.

A primary object of this invention is to provide a slide support for tape reels which provides for a closely spaced vertical storage arrangement of a plurality of the reels.

A further object is to provide a vertical wall with substantially horizontal slide-ways in the required spacing and angularity and to fashion each reel with a slide cooperatively engageable with and slidable on the wall slide-way so that the reel may be suspended from the wall in a cantilever arrangement.

A further object is to satisfy the above requirements and provide a tape reel with a removable peripheral seal against dust and thus eliminate the need for a separate storage casing.

Another object is to employ such a seal for slidably mounting a reel on a vertical wall without interfering with the normal use of the reel and its tape. Further objects will be apparent in the following disclosure.

In accordance with my invention, I provide a vertical wall and a set of reeled tape supports with cooperating slide members whereby the loaded support may be slid into position on the wall and be there mounted and which are so arranged that each support may be selectively removed from the wall merely by pulling it outwardly along the slide-ways. In one construction, the sides of the reel may be fashioned to provide a slide, and a vertical wall which is to carry the reels has projecting members providing slide-ways adapted to interfit with the slides and form a support therefor. In another form, the reel may be provided with a peripheral sealing band shaped to prevent access of dust to the tape and which has a projection provided with a slide member arranged to cooperate with the wall slide-ways.

Referring to the drawing illustrating such embodiments of the invention:

Figures 1, 2, 3, 4, 5:
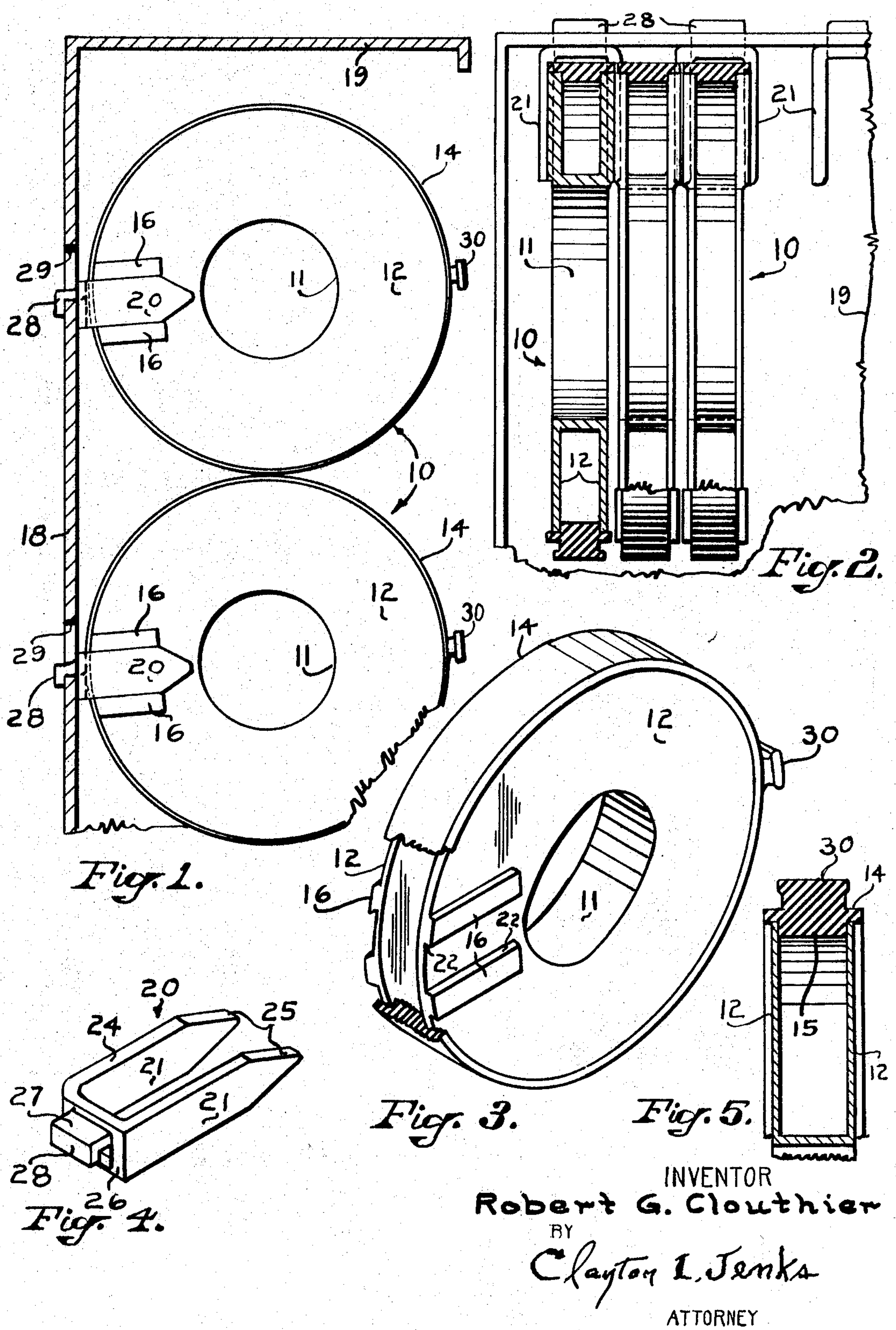
FIG. 1 is a fragmentary vertical sectional view of a cabinet wall having projecting slide-ways and two tape reels having slides mounted on the wall slide-ways.
FIG. 2 is a fragmentary end elevation, with parts broken away and in section, showing three reels slidably mounted on their wall slide-way supports.
FIG. 3 is a perspective view of a reel provided with lateral slides and a dust seal partly broken away.
FIG. 4 is a perspective view of a U-shaped slide-way adapted to be removably mounted on a vertical wall for supporting the reel of FIG. 3.
FIG. 5 is a fragmentary sectional view of a tape reel and its dust seal.

Referring first to FIGS. 1–5, a standard tape reel 10 of metal or molded plastic comprises a core 11 on which tape is wound between parallel flanges or side walls 12. It is preferred that the reel sides or flanges 12 be of continuous material without perforations so as to prevent access of dust. After a tape has been wound on the core 11, a peripheral sealing ring or band 14 may be mounted on the edge portions of the flanges 12 to keep out foreign matter. That sealing band may be made of a slightly elastic or flexible material, such as rubber or a plastic. It is wider, as shown in FIG. 5, than the width of the reel and so overlaps the flanges 12. The band may also be provided with an inner portion 15 that fits down between the flanges and thus locates the band in its sealing position.

To provide a slide mount for the reel, the outer sides of the flanges 12 are fashioned with parallel spaced lugs or slide members or slides 16 which are substantially radial of the reel and project laterally only enough for supporting the reel. To support a set of these reels, a vertical wall 18, which may be a room wall or the back wall of a cabinet 19 as shown diagrammatically in FIGS. 1 and 2, is provided with slide-ways 20 which are so shaped that the slides 16 may be removably carried thereby.

Of the various structures which may be adapted for the purpose, I prefer the U-shaped mount 20 of FIG. 4 which has two parallel arms 21 of equal vertical height arranged to make a sliding fit between the spaced side lugs or slides 16 of the reel. Those reel slides 16 are preferably rectangular in cross section and have opposed upper and lower parallel surfaces 22 (FIG. 3) which slide on the arms 21. The top and bottom faces 24 of the arms 21 of the U-member 20 are spaced to provide a reasonably snug fit with the parallel slide surfaces 22 of the reel slides 16 when the reel is inserted between the arms 21. Also, the arms 21 may be provided with rounded or tapered ends 25 which serve as guides and make it easy to slide the reel into position on the slide-ways. As shown in FIG. 2, the mounts 20 may be so spaced that a reel may be located between two mounts and carried by the adjacent arms 21 of such mounts, so that each arm 21 carries the slides 16 of two reels on its opposite sides.

The U-shaped slide-way member 20 may be bolted or welded to the vertical wall 18, but these members are preferably removable. To that end, the back wall 26 (FIG. 4) of the member 20 is provided with a stamped out portion 27 which is bent to form a downwardly projecting flange 28 parallel with and spaced from the wall 26. The rear wall 18 of the cabinet is provided with slots or openings 29 into which the locking prongs 27, 28 may be inserted and moved down to interlock with the wall. That is, the flange 28 is parallel with and spaced from the rear wall 26 of the member 20 by a distance slightly greater than the thickness of wall 18 which permits the flange 28 to fit into place on the wall and interlock snugly therewith. As shown in FIG. 1, the slide-way 20 preferably slopes slightly upwardly away from the wall 18 and at such an acute angle that gravity tends to hold the reel in position on its slide-way.

A plurality of reels (FIG. 2) may be mounted in a close side by side arrangement on the slide-way arms 21 which are suitably spaced for the purpose. These arms are preferably nearly as long as the radial dimension of the annulus of the reel from the core 11 to the peripheral edge of the side or flange 12. To aid in removing the reel from its supported position, the band 14 may be provided with a knob or draw pull 30 which is located substantially opposite the slides 16, so that it is merely necessary to pull outwardly on the knob to remove the reel. In assembling a reel on its associated slide-way, various expedients may be adopted, but ordinarily it is sufficient to balance the reel on one finger as it is being moved into place by means of the knob 30.

Figure 6:
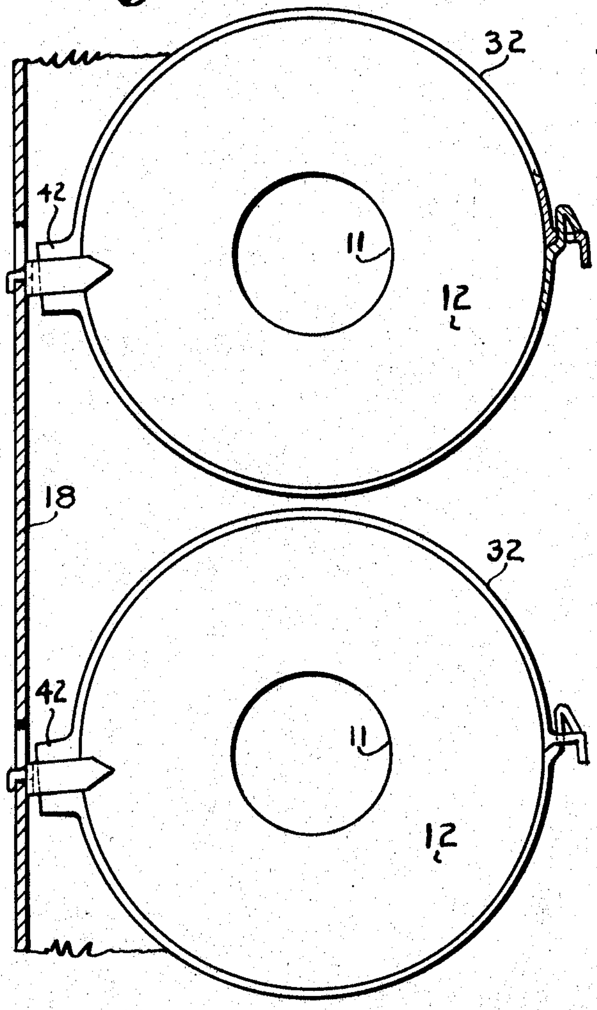
FIG. 6 is a fragmentary view similar to FIG. 1 of a modification which shows two reels each of which has a removable peripheral band provided with a slide member shaped for mounting on the wall slide-ways.
Figure 10:
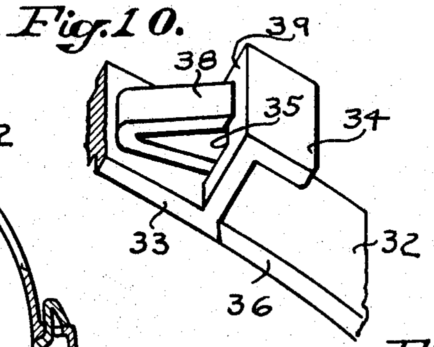
FIG. 10 is a fragmentary perspective view of a lock which holds the ends of the sealing band together and serves as a draw pull.
Figure 7:
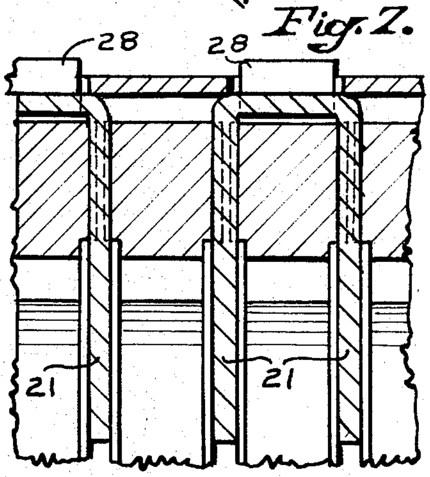
FIG. 7 is a fragmentary view, similar to FIG. 2, showing several reels of the FIG. 6 type mounted on a wall.

In the construction above described the slides 16 are fashioned by plastic molding, if the reel is made of plastic, or of metal strips welded onto a metal reel side; but to employ this invention with a standard reel, I may use the construction of FIGS. 6 to 12 inclusive. As there shown, the band 14 of FIG. 5 may be replaced by a two ended band 32 which in cross section may follow the structure of FIG. 5 in that it rides between and on top of the edge portions of the reel flanges 12. The two ends of the band 32 may be locked together, as shown in FIG. 6, by a suitable locking device which will hold the band tightly positioned on the peripheries of the reel flanges 12. This may comprise the structure shown in FIG. 10 wherein one end 33 of the band may have an upstanding L-shaped locking lug 34 provided with a hole 35 therein. The other end 36 of the band 32 has a V-shaped locking member 38 of resilient material, such as a stiff but resilient metal or plastic strip, which is sized to be inserted through the hole 35 and have its end spring outwardly to lock against the outer surface 39 of the lug 34. To unlock the parts, the operator squeezes the V-shaped lock sufficiently to cause the end 38 to be moved back through the hole 35.

Figure 11:
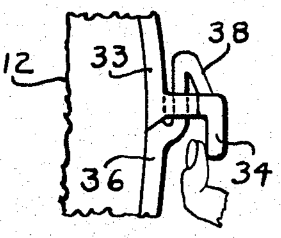
FIG. 11 is a fragmentary side elevation of the band lock.
Figure 12:
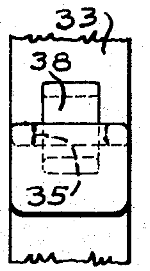
FIG. 12 is a plan view of the lock of FIGS. 10 and 11.
Figure 8:
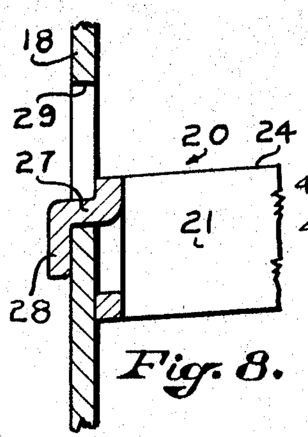
FIG. 8 is a fragmentary sectional view of the same showing the interlocking of the slide-way member with a cabinet wall.
Figure 9:
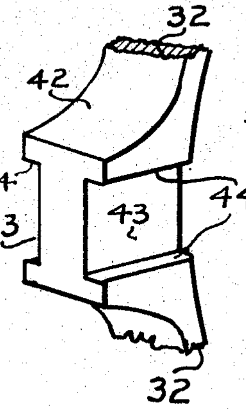
FIG. 9 is a fragmentary perspective view of a projection or lug on the reel sealing band which has slides arranged to cooperate with a wall slide-way.

In accordance with this phase of the invention, the band 32 which interfits with the peripheral reel flanges 12 is provided with a slide member shaped to be slidably interfitted with the arms 21 of the slide-way shown in FIG. 4. As shown in FIG. 9 the peripheral band 32 is provided with a projecting lug 42 which is of such length and shape as to provide the required slide members to interfit with the arms 21 of the wall slide-way. The opposite sides of the lug 42 are formed with two parallel and similar recesses 43 of equal depths having parallel spaced slide surfaces 44 which are shaped to slide on and interfit with the slide surfaces 24 of the arms 21. The depth of each recess may be half the thickness of the arm 21 so that two adjacent reels may slide on the same arm. To remove a reel, the operator may insert his finger beneath the lug 34, as shown in FIG 11, and pull outwardly.

It will now be appreciated that the slide carried by the reeled tape support may be mounted on the casing or box in which a tape reel has been normally supported. That is, the slide members shown in FIG. 3 may be fashioned on the outer parallel sides of the casing so that after the loaded reel has been placed therein the casing may be slid into place on the slide-way construction of FIG. 4. It is equally feasible to fashion the casing supporting member as a clip which has a projection provided with slides on its opposite sides.

Figure 13:
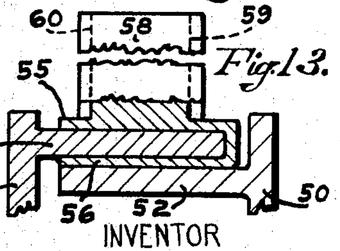
FIG. 13 is a fragmentary section showing a clip having a lug provided with slides for mounting on a carrier.

A modification of the clip structure shown in my prior application Serial No. 437,501, filed March 5, 1965, is shown in FIG. 13. The standard carrier or casing for a tape reel comprises a molded plastic body having two disk shaped plates 50 and 51 which carry laterally projecting cylindrical flanges 52 and 53 shaped to telescope slidably and thereby form a casing around the reeled tape that has been wound on its core. In accordance with this aspect of my invention, I provide a U-shaped clip of suitable material, such as metal or a resilient plastic, which comprises two parallel arms 55 and 56 adapted to slidably interfit with the outside flange 53 of the casing. The arms are made thin enough, or the casing flanges are cut away sufficiently, to provide room for the clip arms to be mounted on the flange 53 and yet permit the two flanges of the casing to telescope properly. The outer arm 55 of the clip is provided with a projecting lug or member 58 which has two long grooves on its opposite sides providing recesses 59 and 60 which form parallel slides adapted to interfit with the slide-ways of the construction of FIG. 4. These slide recesses may be made to conform with the showing of the parts 43 and 44 of FIG. 9. This modification, therefore, provides a simple structure which may be used with a standard casing as has been marketed for enclosing and protecting the loaded tape reel.

It will now be understood that I have provided a construction for slidably mounting on wall slide-ways a reeled tape support, whether it be the tape reel or a carrier casing of a disk shape, which provides for mounting the reeled tapes in a close lateral arrangement. The reel or its casing has a slide provided with slide members that are aligned with a chord of a circle defining the periphery of the reeled tape. This slide of the reeled tape support may be patterned in accordance with FIGS. 3, 9, and 13. Each slide as thus formed is arranged to interfit with slide-ways provided by the structure of FIG. 4 or other equivalent construction, and the parts are so arranged as to hold the tapes in substantially vertical positions and a close lateral spacing. It will also be appreciated that the slides on the reeled tape supports may be arranged at a considerable angle to a radius, in which case the slide-ways of FIG. 4 are tilted upwardly at such an angle as to interfit with the tape support slides. To assemble the parts, the tape support is lifted to a position where its slide members are located above the wall slide-ways and are required to move downwardly to a seating position. Whatever slide construction is used, it is preferred to have a draw pull attached to the reel or its carrier casing in such a position that the tape support may be slid outwardly from its suspended position on the wall.

Various modifications may be made in the structure within the scope of this invention, and the above disclosure is not to be interpreted as imposing limitations on the appended claims.

I claim:

1. A tape reel file comprising a set of disk shaped supports for reeled tapes, each support having a slide aligned with a chord of the reeled tape, a reel supporting vertical wall having a plurality of laterally projecting arms forming slide-ways cooperatively engageable with the slides of the tape supports which serve to support the tapes in substantially vertical positions and a close lateral spacing.

2. A tape reel file according to claim 1 in which the slide-ways on the wall are inclined upwardly away therefrom at a small acute angle and urge the tape supports to seat close to the wall.

3. A tape reel file according to claim 1 comprising lugs projecting laterally from the sides of the supports which form said slides, and wherein the slide-way arms are so spaced that said lugs may slide between two adjacent arms and be supported thereby.

4. A tape reel file according to claim 1 comprising a draw pull on the support opposite to the slide-way which serves for manually withdrawing the reel from the wall slide-way.

5. A tape reel file comprising a plurality of tape reels, each of which has a core and parallel spaced non-perforated flanges, each reel being provided with a slide aligned with a chord thereof, a vertical supporting wall having a plurality of spaced projecting members providing slide-ways arranged to cooperate with the reel slides and support a set of the reels in a substantially vertical and closely spaced arrangement, and a closure band on the flanges of a reel which seals the space around a tape wound on the core.

6. A tape reel file comprising a plurality of tape reels, each of which has parallel flanges fixed on a cylindrical tape support, and a cabinet wall having upwardly tilted, outwardly projecting slide-ways spaced by at least the thickness of a reel, a band mounted on the peripheries of the said flanges, said band of each reel having a laterally projecting lug providing a slide which cooperates with a slide-way on said wall to suspend the reels in a vertical laterally spaced arrangement.

7. A tape reel file comprising a wall having a plurality of projecting members providing spaced slide-ways, a set of tape reels having parallel flanges mounted on tape supporting cores, lugs mounted on said flanges which project outwardly and laterally therefrom and provide slides arranged to cooperate with said slide-ways for mounting the reels in a vertical closely spaced arrangement.

8. A tape reel file comprising a set of reeled tape supports each of which has a slide aligned with a chord of the reeled tape, a cabinet wall having a set of outwardly projecting members providing slide-ways spaced by at least the thickness of a tape support which cooperate with said slides for mounting the supports in a closely spaced lateral arrangement, said wall having a plurality of horizontally arranged slots, and each member having a hook shaped rear end projecting downwardly, said rear ends and slots being arranged for removably interfitting the hooked shaped ends in the slots.

9. A tape reel file according to claim 8 in which the wall slide-way member is U-shaped and has arms spaced by about the thickness of a tape support which provides slide-ways so arranged that the slides may be mounted between said arms.

10. A tape reel file according to claim 8 in which the slide-way members are spaced by about the thickness of a reel so that reels may be supported between two adjacent arms of said wall members as well as between the arms.

11. A tape reel file according to claim 1 in which each support comprises a two part casing having telescoping cylindrical flanges and a U-shaped clip removably mounted on the outer flange, said clip having a lug projecting therefrom which has parallel slides on its opposite sides arranged to slidably interfit with said slide-ways.

References Cited by the Examiner

UNITED STATES PATENTS

| | | | |
|---|---|---|---|
| 1,291,492 | 1/1919 | Haigh | 220—23.4 |
| 2,720,439 | 10/1955 | Cristoval | 312—206 |
| 2,797,817 | 7/1957 | Shugarman | 211—96 |
| 3,095,969 | 7/1963 | Morrison | 206—53 |
| 3,235,067 | 2/1966 | Hultgren | 206—52 |

CLAUDE A. LE ROY, *Primary Examiner.*

W. D. LOULAN, *Assistant Examiner.*